(12) United States Patent
Ishizuka

(10) Patent No.: US 6,492,782 B2  
(45) Date of Patent: Dec. 10, 2002

(54) IMAGE INPUT APPARATUS, IMAGE INPUT SYSTEM, LIGHT SOURCE CONTROL METHOD, AND STORAGE MEDIUM

(75) Inventor: Daisuke Ishizuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,278

(22) Filed: Mar. 7, 2001

(65) Prior Publication Data

US 2002/0008878 A1 Jan. 24, 2002

(30) Foreign Application Priority Data

Mar. 10, 2000 (JP) ........................................ 2000-066346

(51) Int. Cl.$^7$ ............................................. H05B 37/02
(52) U.S. Cl. ...................... 315/360; 315/362; 315/312; 358/530; 358/448; 358/462; 355/35; 355/83
(58) Field of Search ................................. 315/312, 360, 315/362, 366, 368.12, 368.15; 358/401, 448, 462, 471, 474, 498, 501, 505, 530; 355/35, 55, 72, 75, 69, 83; 345/130, 136

(56) References Cited

U.S. PATENT DOCUMENTS 5,889,927 A * 3/1999 Suzuki ........................ 345/698
6,023,342 A * 2/2000 Yanagida ..................... 358/1.15
6,088,084 A * 7/2000 Nishio ........................... 355/55

* cited by examiner

Primary Examiner—Haissa Philogene
(74) Attorney, Agent, or Firm—Morgan & Finnegan, L.L.P.

(57) ABSTRACT

It is an object of this invention to provide an image input apparatus, image input system, light source control method, and storage medium capable of providing on the market an image input apparatus which greatly reduces the time before actual reading starts and which can be easily used in a manner based upon the energy saving standard. To achieve this object, the image input apparatus includes internal and external light sources for irradiating an original, an internal light source light amount controller for turning on/off the internal light source, an external light source light amount controller for turning on/off the external light source, a CCD for reading an original irradiated with light, a RAM for temporarily storing the read data, an interface circuit for transferring the data stored in the RAM to an external apparatus, and a CPU for turning on the light sources when an application program is enabled by the OS of the external apparatus.

16 Claims, 8 Drawing Sheets

IMAGE INPUT APPARATUS, IMAGE INPUT SYSTEM, LIGHT SOURCE CONTROL METHOD, AND STORAGE MEDIUM

FIELD OF THE INVENTION

The present invention relates to an image input apparatus, image input system, light source control method, and storage medium and, more particularly, to an image input apparatus, image input system, light source control method, and storage medium suitably applicable to a scanner apparatus or copying machine having a read position aligning function.

BACKGROUND OF THE INVENTION

Recently, with the explosive spread of personal computers, demand for peripheral devices is also abruptly increasing. In particular, image input apparatuses, so-called scanners, for inputting images from originals are used more widely than expected. Accordingly, in addition to conventional design requirements such as high image quality and high resolution, the maturation of products from the viewpoint of the ease of use, such as the ease of use in general homes, is newly demanded. That is, consideration for beginners, e.g., the ability to input images easier and faster, is of much concern in the market.

Also, in the recent electrical appliance industry, low power consumption is the keyword, and standards and the like meeting this demand are extensively proposed. By achieving items determined by these standards, all manufacturers reflect this demand to their products in order to obtain indices accepted by general customers. As scanner standards, ENERGY STAR (specifications for promoting power saving in standby state, announced by US Environmental Protection Agency) is available as an index for energy saving of electronic appliances. This ENERGY STAR has the reference that the consumption power in standby state should be decreased to 12 W or less. To meet this reference, processing by which, when an original illuminating light source which consumes large power is not used for a long time, a standby mode starts and the lamp is automatically turned off, is installed into a scanner.

Unfortunately, the following problems arise when the above-mentioned processing function by which a standby mode starts and the lamp is automatically turned off if the original illuminating light source is not used for a long time is imparted to a scanner. That is, the temperature characteristic of the lamp used in a scanner has a large effect on the light amount; after the lamp is turned on, a certain time is necessary before a light amount stable enough to start scanning is reached. In currently available scanners, the lamp is turned on at the beginning of scan, and actual image reading is started after the light amount (temperature) of the lamp becomes stable.

Accordingly, a very long time is necessary before reading is actually started after a user has instructed the scanner to start scanning. This gives the user a long waiting time. In addition, this long waiting time sometimes gives the user the anxiety as to whether the scanner itself is normally operating. Also, since the present situation is that the cost is going down steadily, these scanner lamps are gradually replaced with inexpensive ones having inferior temperature characteristics. This tendency is nothing but the cause of worsening the ease of use from the user's viewpoint for the reasons mentioned earlier, and hence obviously poses a serious problem in the future. Furthermore, in the long waiting time before reading starts, the user is likely to cause operation errors or misunderstand that some inconvenience has occurred.

SUMMARY OF THE INVENTION

The present invention has been made in consideration of the above situation, and has as its first object to provide an image input apparatus, image input system, light source control method, and storage medium capable of providing in the market an image input apparatus which greatly reduces the time before actual reading starts and which can be easily used in a manner based upon the energy saving standard.

It is the second object of the present invention to provide an image input apparatus, image input system, light source control method, and storage medium which, while a light amount is unstable, can inhibit the display of an input screen of an image reading application program and can display information indicating that the light amount is currently being adjusted, thereby preventing operation errors and avoiding misunderstanding of an operator.

To achieve the above objects, an image input apparatus according to the present invention is characterized by the following arrangement.

That is an image input apparatus controllable from an external apparatus comprises a light source for irradiating an original, reading means for reading the original irradiated by said light source, and control means for turning on said light source when image input apparatus operating means of said external apparatus is enabled.

Also, an image input system according to the present invention is characterized by the following arrangement.

That is, an image input system comprising an external apparatus and an image input apparatus controllable from said external apparatus, wherein said image input apparatus comprises a light source for irradiating an original, reading means for reading the original irradiated by said light source, and control means for turning on said light source when image input apparatus operating means of said external apparatus is enabled.

According to its first aspect, a light source control method according to the present invention is characterized by the following steps.

That is, a light source control method applied to an image input system comprising an image input apparatus which comprises a light source for irradiating an original, and reading means for reading the original irradiated by said light source, and an external apparatus which comprises image input apparatus operating means, wherein said light source is turned on when said operating means of said external apparatus is enabled.

According to its second aspect, the light source control method according to the present invention is characterized by the following steps.

That is, a light source control method applied to an image input system comprising an image input apparatus which comprises a plurality of light sources for irradiating an original, and reading means for reading the original irradiated by said light sources, and an external apparatus which comprises image input apparatus operating means, and light source selecting means included in said operating means to select a light source to be used in reading from said plurality of light sources, characterized by comprising the steps of turning on all said light sources when said operating means is enabled; turning off a light source except for a light source selected by said light source selecting means when said operating means of said external apparatus generates read designation while said light sources are ON; and turning on a light source selected by said light source selecting means when said operating means of said external apparatus generates read designation while said light sources are OFF.

According to its first aspect, a storage medium according to the present invention is characterized by the following arrangement.

That is, a computer-readable storage medium storing a program for executing a light source control method applied to an image input system comprising an image input apparatus which comprises a light source for irradiating an original, and reading means for reading the original irradiated by said light source, and an external apparatus which comprises image input apparatus operating means, wherein said light source control method turns on said light source when said operating means of said external apparatus is enabled.

According to its second aspect, the storage medium according to the present invention is characterized by the following arrangement.

That is, a computer-readable storage medium storing a program for executing a light source control method applied to an image input system comprising an image input apparatus which comprises a plurality of light sources for irradiating an original, and reading means for reading the original irradiated by said light sources, and an external apparatus which comprises image input apparatus operating means, and light source selecting means included in said operating means to select a light source to be used in reading from said plurality of light sources, wherein said light source control method comprises the steps of: turning on all said light sources when said operating means is enabled; turning off a light source except for a light source selected by said light source selecting means when said operating means of said external apparatus generates read designation while said light sources are ON; and turning on a light source selected by said light source selecting means when said operating means of said external apparatus generates read designation while said light sources are OFF.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The first and second embodiments of the present invention will be described in detail below with reference to the accompanying drawings.

[First Embodiment]

Figure 1:
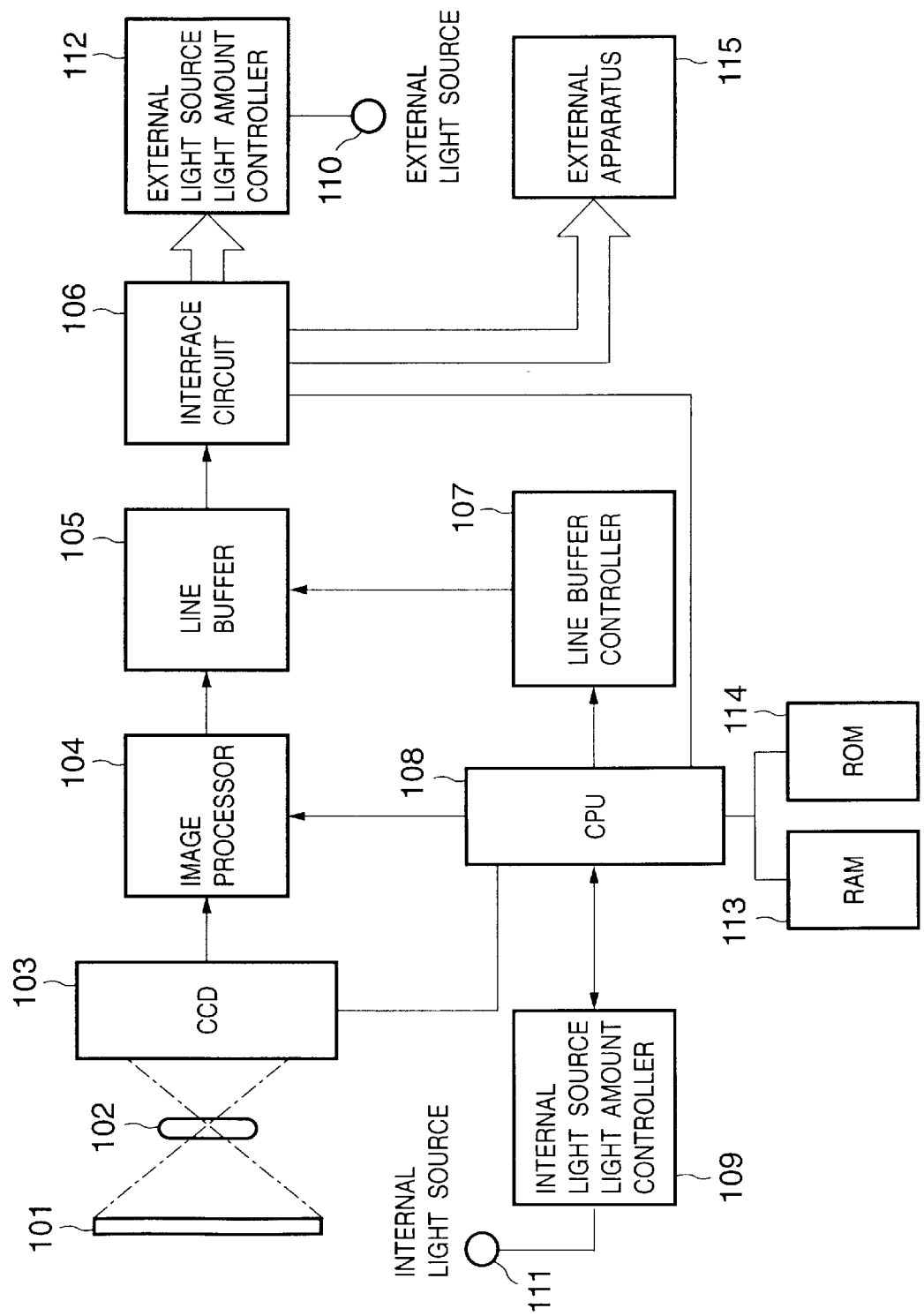
FIG. 1 is a block diagram showing the electrical configuration of particularly an image input apparatus of an image input system according to the first and second embodiments of the present invention.

FIG. 1 is a block diagram showing the electrical configuration of an image input apparatus of an image input system according to the first embodiment of the present invention. This image input apparatus according to the first embodiment of the present invention comprises a lens 102, image sensor (CCD) 103, image processor 104, line buffer 105, interface circuit 106, line buffer controller 107, CPU 108, internal light source 111, internal light source light amount controller 109, external light source 110, external light source light amount controller 112, RAM 113, and ROM 114. Reference numeral 101 denotes an original; and 115, an external apparatus which constructs the image input system together with the image input apparatus. This first embodiment of the present invention will be explained by taking a scanner apparatus as an example of the image input apparatus.

Details of the above arrangement will be described below. The lens 102 forms an image of light from the original 101 which is an object of image reading and is irradiated with light, onto the image sensor (CCD) 103. This image sensor (CCD) 103 converts the image formed by the lens 102 into an electrical signal. The image processor 104 binarizes the output read signal from the image sensor (CCD) 103. The line buffer 105 is for start and stop. The interface circuit 106 is used to communicate with the external apparatus 115 and an external optional device (a transmitting original reading unit (a press plate device with a light source), not shown). The line buffer controller 107 controls the line buffer 105 for each color light source.

The CPU 108 is a central processing unit for controlling the whole image input apparatus. This CPU 108 executes processes shown in flow charts of FIGS. 4, 6, and 7 on the basis of programs. The RAM 113 is a random-access memory for temporarily storing data. The ROM 114 is a read-only memory storing programs and permanent data. These RAM 113 and ROM 114 designate the number of storage lines to the line buffer controller 107, and the interface circuit 106 obtains information of the external apparatus 115 and the external optional device (not shown). Also, control programs executed until the light amounts of the internal light source 111 and the external light source 110 become stable are embedded in the ROM 114. When the start of scanning is designated, therefore, actual reading is not started until the internal light source 111 and the external light source 110 obtain sufficient and stable light amounts.

The internal light source 111 is a reflecting original reading lamp for illuminating an original from below. The internal light source light amount controller 109 controls ON/OFF of this internal light source 111. The external light source 110 is a transmitting original reading lamp for illuminating an original from above. The external light source light amount controller 112 controls ON/OFF of this external light source 110 which constructs a transmitting original reading unit connected via the interface circuit 106.

The external apparatus 115 is an apparatus such as a computer connected to the interface circuit 106 of this image input apparatus. This external apparatus 115 contains an image reading application program for operating the image input apparatus according to the first and second embodiments of the present invention, and an OS (Operating System) including functions for controlling the execution and termination of the program.

Figure 2:
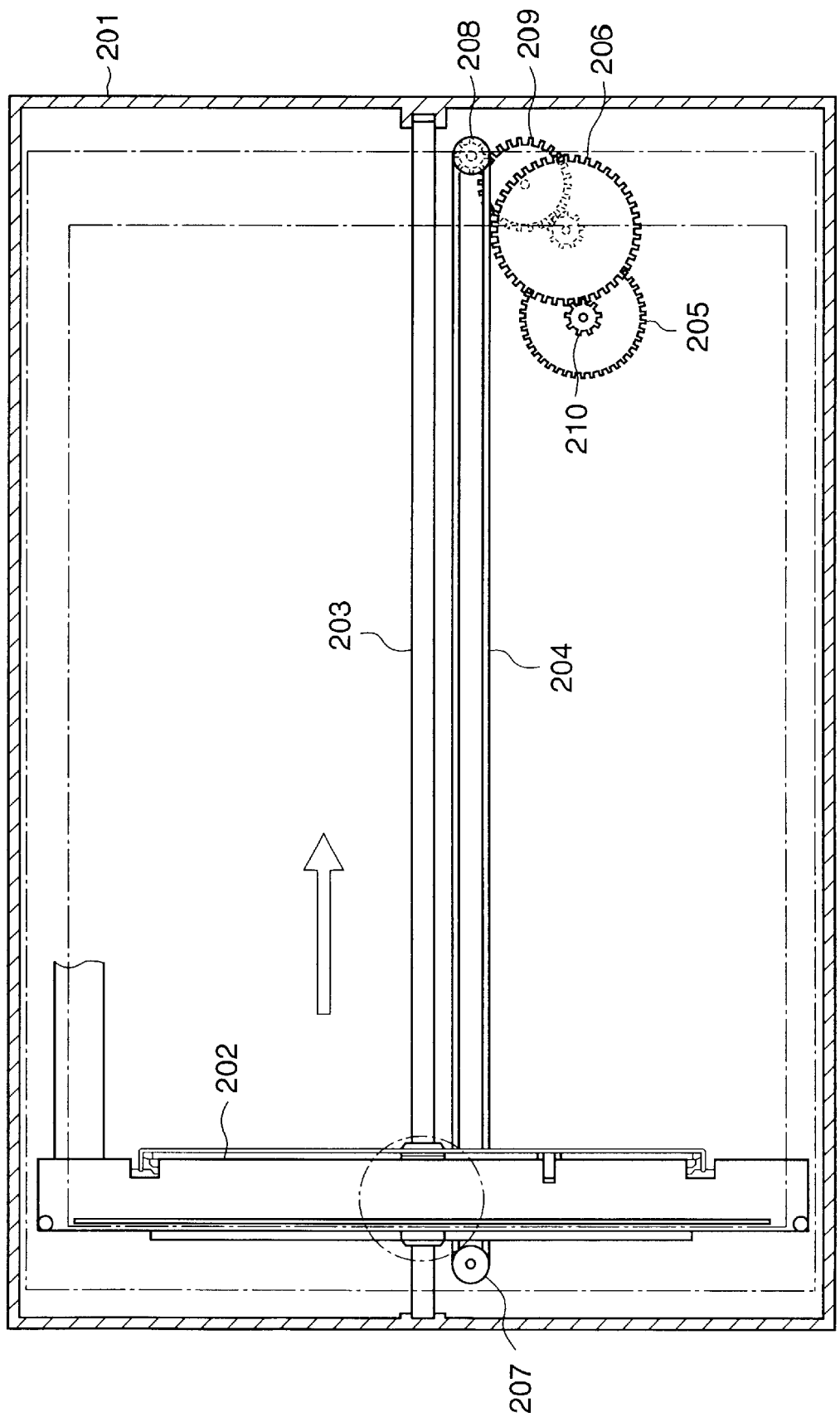
FIG. 2 is a cross-sectional view showing the mechanical arrangement of the major parts of the image input apparatus of the image input system according to the first and second embodiments of the present invention.

FIG. 2 is a cross-sectional view showing the mechanical arrangement of the main components of the image input apparatus according to the first embodiment of the present invention shown in FIG. 1. The image input apparatus according to the first embodiment of the present invention includes, inside a frame 201, a sensor unit 202, reference shaft 203, operating belt 204, stepping motor 205, gears 206 and 209, pulleys 207 and 208, and the like.

Details of the above arrangement are as follows. Inside the frame 201 of this image input apparatus, the reference shaft 203 is placed in the center along the longitudinal direction. Parallel to this reference shaft 203, the endless operating belt 204 is rotatably wound on the pair of pulleys 207 and 208. The reference shaft 203 which guides the sensor unit 202 in the sub-scan direction (the direction indicated by an arrow in FIG. 2) is extended through the center of this sensor unit 202. The sensor unit 202 is also fixed to the operating belt 204. The gear 209 engages with the pulley 208 on which the operating belt 204 is wound. The gear 206 meshes with the gear 209, and an output shaft 210 of the stepping motor 205 engages with the gear 206.

That is, the reference shaft 203 is a shaft serving as a reference for moving the sensor unit 202 in the sub-scan direction (the arrow direction in FIG. 2). The operating belt 204 is connected to the sensor unit 202 to move this sensor unit 202 in the sub-scan direction (the arrow direction in FIG. 2) along the reference shaft 203. The stepping motor 205 generates rotational driving force via the output shaft 210. The gears 206 and 209 transmit this rotational driving force from the output shaft 210 of the stepping motor 205 to the operating belt 204 via the pulley 208.

Upon receiving a scan instruction from the external apparatus 115, the CPU 108 of this image input apparatus drives the stepping motor 205, thereby driving the operating belt 204 via the gears 206 and 209. Consequently, the sensor unit 202 moves in the sub-scan direction (the arrow direction in FIG. 2) along the reference shaft 203 and reads an image from an original.

Figure 9:
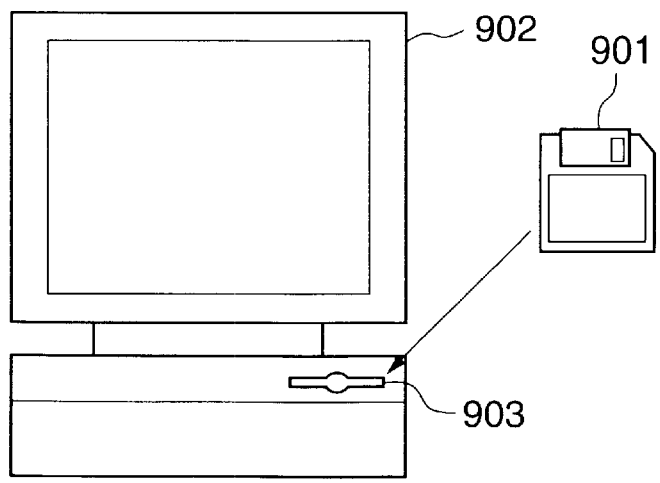
FIG. 9 is a view for explaining the concept by which the programs and relevant data are supplied from the storage medium to the apparatus according to the first and second embodiments of the present invention.

FIG. 9 is a view for explaining the concept by which programs and relevant data according to the first and second embodiments of the present invention are supplied from a storage medium to the apparatus. These programs and relevant data are supplied by loading a storage medium 901 such as a floppy disk or CD-ROM into a storage medium driver insertion slot 903 formed in an apparatus 902 such as a computer. After that, the programs and relevant data are once installed from the storage medium 901 into a hard disk and loaded from this hard disk into the RAM, or are directly loaded into the RAM without being installed in the hard disk. In this manner, the programs and relevant data can be executed.

These programs can be executed in the image input system according to the first and second embodiments of the present invention by supplying the programs and relevant data to the image input apparatus and to the external apparatus following the procedure as shown in FIG. 9, or by prestoring the programs and relevant data in the image input apparatus and the external apparatus.

Figure 7:
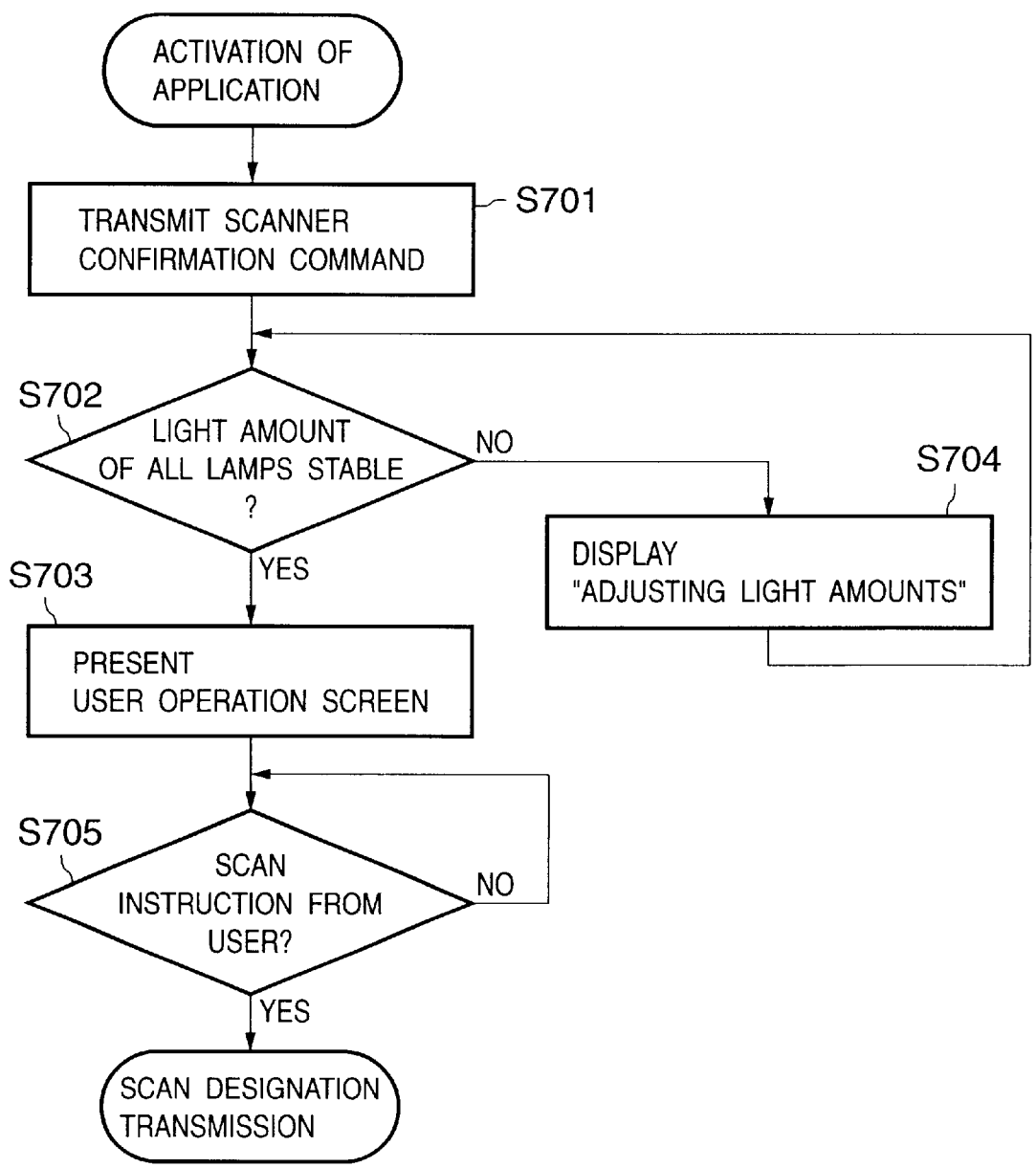
FIG. 7 is a flow chart showing the operation of an application program of an external apparatus of the image input system according to the second embodiment of the present invention.
Figure 8:
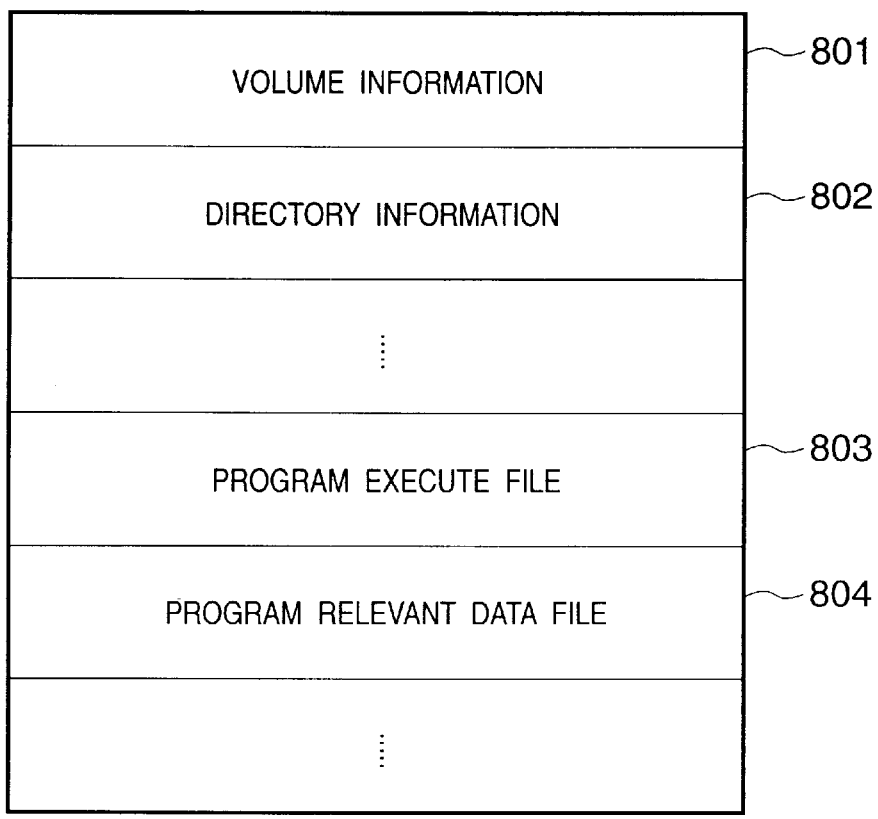
FIG. 8 is a view for explaining the configuration of the stored contents of a storage medium storing programs and relevant data according to the first and second embodiments of the present invention.

FIG. 8 is a view for explaining the configuration of the stored contents of a storage medium storing the programs and relevant data according to the first and second embodiments of the present invention. This storage medium contains, e.g., volume information 801, directory information 802, a program execute file 803, and a program relevant data file 804. These programs are formed into program codes on the basis of the flow charts shown in FIGS. 4, 6, and 7 to be described later.

The correspondence between the scope of claims of the present invention and the first and second embodiments of the present invention is as follows. A light source corresponds to the internal light source 111 and the external light source 110 of the image input apparatus. A light source control means corresponds to the internal light source light amount controller 109 and the external light source light amount controller 112 of the image input apparatus. A reading means corresponds to the CCD 103 of the image input apparatus. A storage means corresponds to the RAM 113 of the image input apparatus. A communicating means corresponds to the interface circuit 106 of the image input apparatus. A control means corresponds to the CPU 108 of the image input apparatus. Operating means and light amount detecting means correspond to the application program of the external apparatus 115. Input means, original type input means, and light source selection designating means correspond to an application screen displayed on the monitor of the external apparatus 115. A switching means corresponds to the OS resident in the external apparatus 115.

The operation of the image input apparatus (scanner apparatus) of the image input system according to the first embodiment of the present invention constructed as above will be described in detail below with reference to FIGS. 3 to 6. In the following explanation of the operation, a lamp is a general term of the internal light source 111 and the external light source 110 described above.

Figure 3:
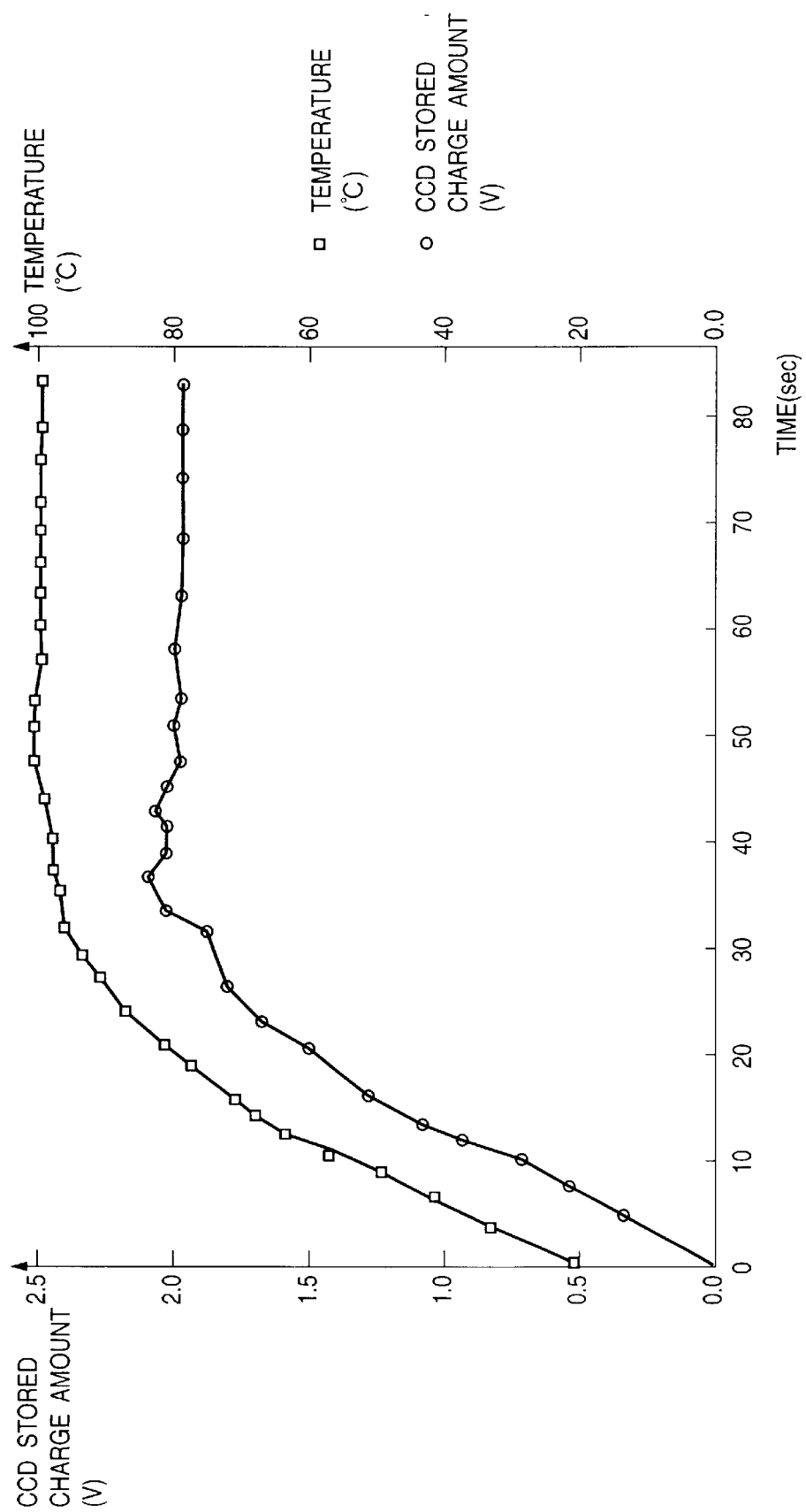
FIG. 3 is a graph for explaining the relationship between the temperature and the CCD output since a light source is turned on in the image input apparatus of the image input system according to the first embodiment of the present invention.

First, changes with time in the temperature and light amount of the light source lamp used in the image input apparatus (scanner apparatus) according to the first embodiment of the present invention after the lamp is turned on will be explained with reference to FIG. 3. As shown in this graph of FIG. 3, both the temperature and light amount of the lamp used in the first embodiment of the present invention stabilize in about 60 sec after the lamp is turned on. This time naturally prolongs as the environmental temperature lowers, because the lamp temperature rises slowly in this case; in contrast, the time shortens as the environmental temperature rises.

Figure 4:
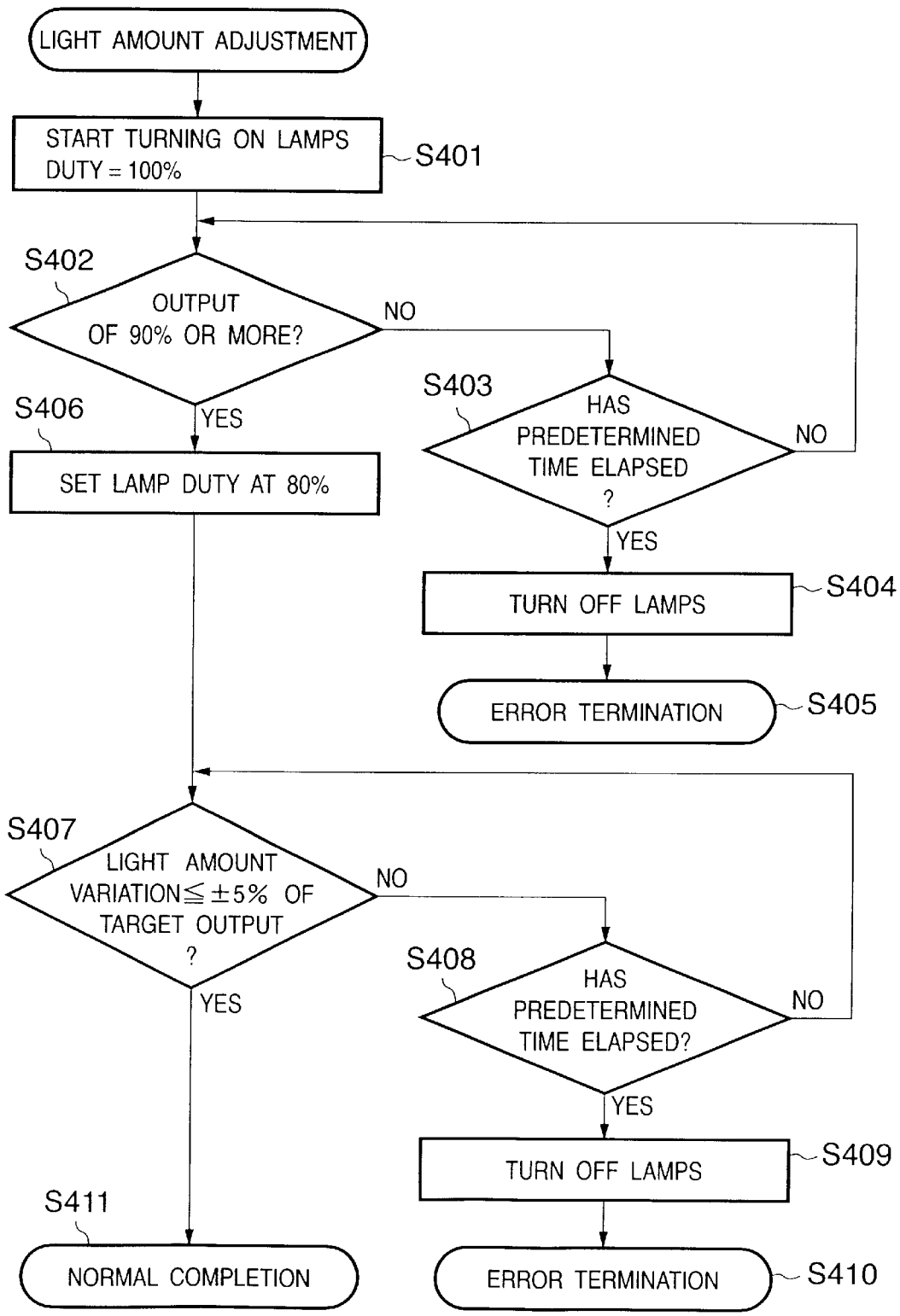
FIG. 4 is a flow chart showing a light amount adjusting procedure when the light source is turned on in the image input apparatus of the image input system according to the first embodiment of the present invention.

Light amount adjustment control will be described below with reference to FIG. 4. The CPU 108 of the image input apparatus (scanner apparatus) according to the first embodiment of the present invention performs this control, until the light amount stabilizes after the lamp is turned on, by executing the light amount control program embedded in the ROM 114. First, the CPU 108 turns on the lamp at DUTY 100% (step S401). The CPU 108 checks whether a CCD output value of 90% or more is output (step S402). If no CCD output value of 90% or more is output, the CPU 108 checks whether a predetermined time has elapsed (step S403). If this predetermined time has not elapsed, the flow returns to the determination process in step S402. If the predetermined time has elapsed, the CPU 108 determines that an error has occurred. Therefore, the CPU 108 turns off the lamp (step S404), and terminates the processing (step S405).

If a CCD output value of 90% or more is obtained, the CPU 108 sets DUTY of the lamp to 80% (step S406). The CPU 108 then checks whether the light amount variation is within ±5% of the target output (step S407). If the light amount variation is not within ±5% of the target output, the CPU 108 checks whether a predetermined time has elapsed (step S408). If this predetermined time has not elapsed, the CPU 108 determines that an error has occurred. Hence, the CPU 108 turns off the lamp (step S409), and terminates the processing (step S410).

If the light amount variation is within ±5% of the target output, the CPU 108 normally completes the light amount adjustment (step S411). DUTY of the lamp is set at 100% in step S401 in order to rapidly warm the lamp, and is set at 80% in step S406 in order to prevent saturation of the electric charge in the CCD 103. By the use of this sequence, the light amount of the lamp can be adjusted faster.

Figure 5:
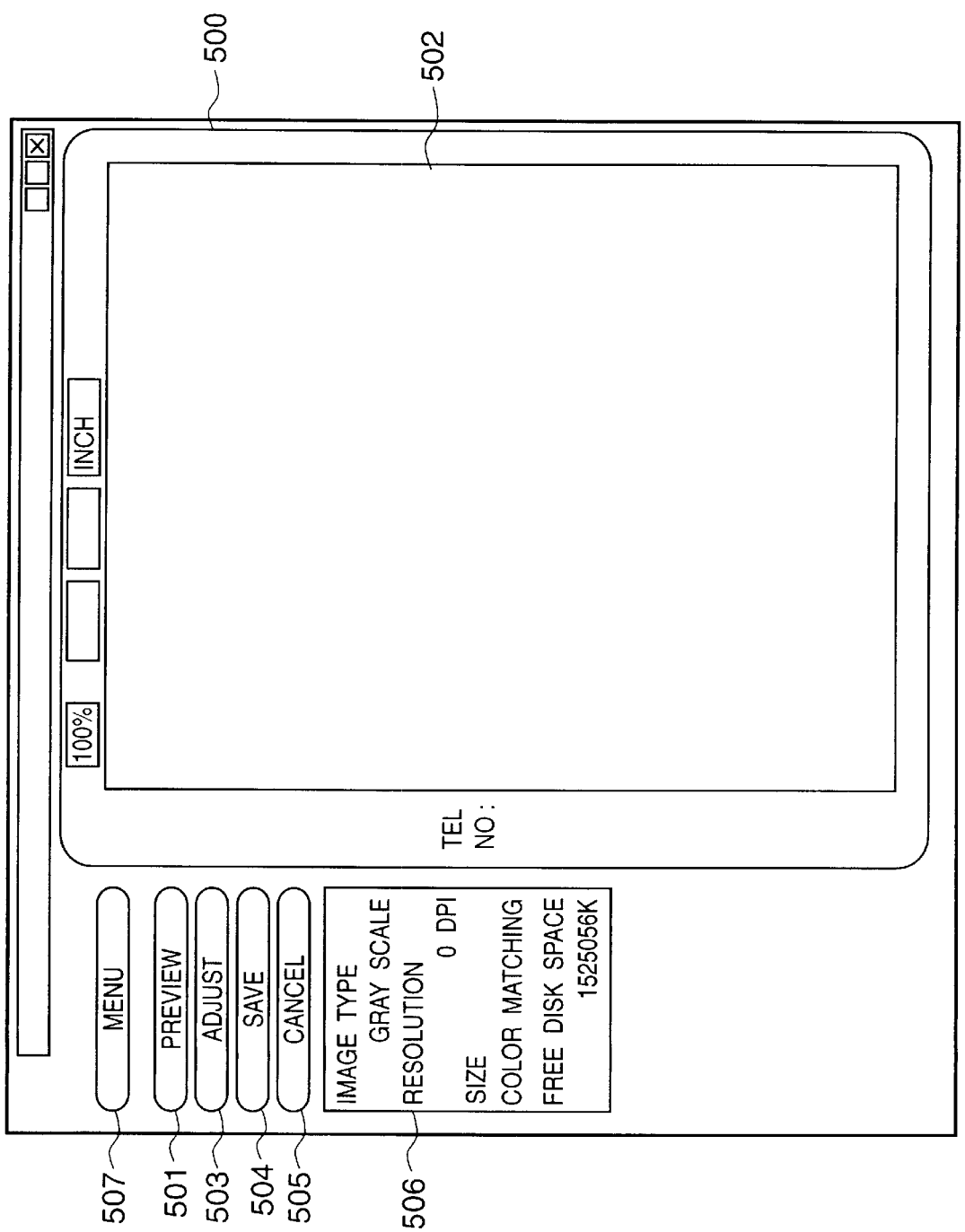
FIG. 5 is a view for explaining an application window for controlling image input values in the image input apparatus of the image input system according to the first embodiment of the present invention.

FIG. 5 is a view for explaining an application program screen executed on the external apparatus 115 (computer) to operate the image input apparatus (scanner apparatus) according to the first embodiment of the present invention to read images. This application program screen includes an application window 500, preview button 501, preview window 502, switch 503, scan start button 504, cancel button 505, window 506, and switch 507.

The preview button 501 is pressed to designate the execution of preview. The preview window 502 displays a previewed image. The switch 503 is pressed to open a window for adjusting reading conditions, including whether to select reading of a reflecting original by the use of the internal light source 111 (reflecting original reading lamp) contained inside the image input apparatus (scanner apparatus), or reading of a transmitting original by the use of the external light source 110 (transmitting original reading lamp) of the external optional device (transmitting original reading unit).

The scanner start button 504 is pressed to cause the image input apparatus to start scanning. The cancel button 505 is pressed to cancel the operations of scan and preview. The window 506 displays, e.g., the present resolution, reading type, and image capacity of the image input apparatus. The switch 507 is pressed to open windows for other settings.

The user inputs parameters in these windows of the external apparatus 115 (computer) and instructs the image input apparatus to perform scan, thereby causing the image input apparatus to execute image reading by the actually designated parameters. The OS resident on the external apparatus 115 (computer) controls the execution.suspension (enable.disable) of this application program.

Figure 6:
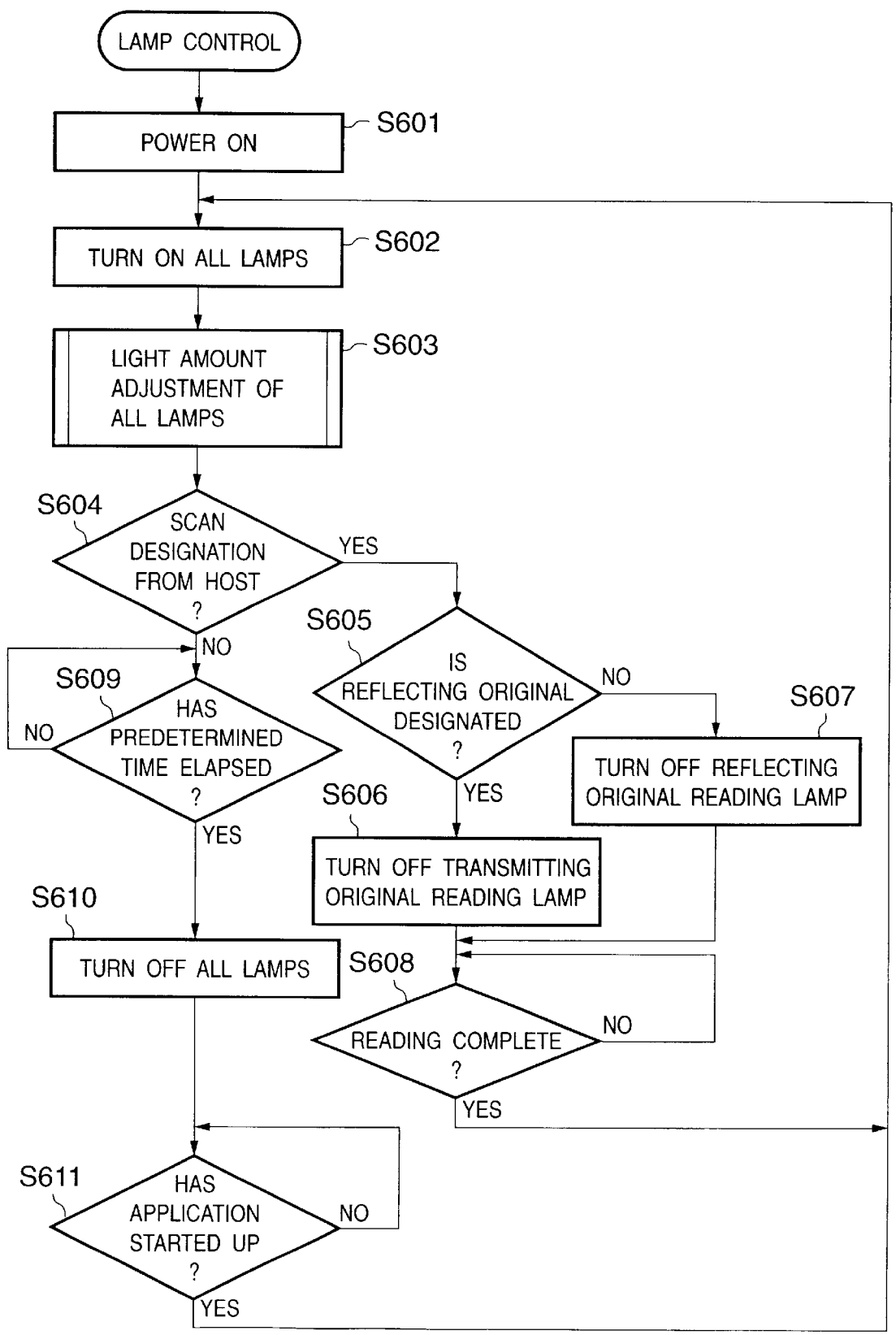
FIG. 6 is a flow chart showing a lamp control procedure in the image input apparatus of the image input system according to the first embodiment of the present invention.

A lamp control sequence in the image input apparatus (scanner apparatus) according to the first embodiment of the present invention will be described below with reference to FIG. 6. FIG. 6 shows the flow of processing since the power supply of this image input apparatus is actually turned on. First, when the power supply of the image input apparatus is turned on (step S601), the CPU 108 turns on all lamps (step S602). Subsequently, the CPU 108 performs the lamp light amount adjustment control explained in the flow chart of FIG. 4 for all the lamps (step S603). The application program for operating the image input apparatus then starts up, and the CPU 108 checks whether scan designation is present (step S604).

If scan designation is present, the CPU 108 checks whether a reflecting original is designated (step S605). If a reflecting original is designated, the CPU 108 turns off the transmitting original reading lamp (external light source 110) (step S606). If a transmitting original rather than a reflecting original is designated, the CPU 108 turns off the reflecting original reading lamp (internal light source 111) (step S607), and waits until the scan is completed (step S608). If the reading is completed, the flow returns to the process of starting turning on all lamps in step S602.

If the application program has not started up and no scan start designation is present, the CPU 108 checks whether a predetermined time has elapsed (step S609). If this predetermined time has not elapsed, the flow returns to step S609. If the predetermined time has elapsed without any scan designation, the CPU 108 turns off all the lamps (step S610). After that, the CPU 108 checks whether the application program for controlling the image input apparatus has started up (step S611). If the CPU 108 detects that the application program has started up, the flow returns to step S602, and the CPU 108 turns on all the lamps.

All the lamps are turned off in step S610 if no scan designation is issued for the predetermined time, in order to meet the ENERGY STAR standard which recommends energy saving.

In the first embodiment of the present invention, control is so performed that all the lamps (the transmitting original reading lamp and the reflecting original reading lamp) are simultaneously turned on in the initial operation. This is to rapidly proceed on to a reading operation regardless of whether a transmitting original or a reflecting original is designated afterward. This can shorten the waiting time for reading.

Also, whether an application program has started up can be determined by an inquiry command supplied to the image input apparatus (scanner apparatus) to confirm the image input apparatus upon startup of the application program. In response to this inquiry command, the image input apparatus transmits the device type and the like to the external apparatus 115 via the interface circuit 106.

In the first embodiment of the present invention as described above, the image input apparatus comprises the internal light source 111 and the external light source 110 for irradiating an original, the internal light source light amount controller 109 for turning on/off the internal light source 111, the external light source light amount controller 112 for turning on/off the external light source 110, the CCD 103 for reading an original irradiated by the light source, the RAM 113 for temporarily storing the read data, the interface circuit 106 for transferring the data stored in the RAM 113 to the external apparatus 115, and the CPU 108 which turns on the light source when the application program is enabled by the OS on the external apparatus 115. Accordingly, this image input apparatus achieves the following functions and effects.

The lamps of the image input apparatus (scanner) are turned on and the light amount adjustment is started at the same time the image reading application program on the external apparatus 115 (computer) starts up. Therefore, the time before actual reading can be greatly reduced compared to the conventional method by which the lamp light amount adjustment is started after the user instructs the image input apparatus (scanner apparatus) to start reading.

Also, when this method of the first embodiment is used, an image input apparatus (scanner apparatus) which can be easily used in a manner based upon the energy saving standard such as ENERGY STAR can be provided on the market.

[Second Embodiment]

As in the first embodiment described above, an image input apparatus according to the second embodiment of the present invention comprises a lens 102, image sensor (CCD) 103, image processor 104, line buffer 105, interface circuit 106, line buffer controller 107, CPU 108, internal light source 111, internal light source light amount controller 109, external light source 110, external light source light amount controller 112, RAM 113, and ROM 114 (FIG. 1).

Also, analogous to the first embodiment, this image input apparatus according to the second embodiment of the present invention comprises, inside a frame 201, a sensor unit 202 for reading an original, a reference shaft 203 for guiding the sensor unit 202 in the sub-scan direction, an operating belt 204 for moving the sensor unit 202 in the sub-scan direction, a stepping motor 205 for generating driving force, gears 206 and 209 for transmitting the driving force of the stepping motor 205 to the operating belt 204, and pulleys 207 and 208 for rotating the operating belt 204 (FIG. 2). The arrangements shown in FIGS. 1 and 2 are already described in detail in the above first embodiment, so a detailed description thereof will be omitted.

In the first embodiment of the present invention described above, the lamp control sequence after the power supply of the external apparatus 115 as a host storing the application program and the power supply of the image input apparatus (scanner apparatus) are turned on is explained. In this second embodiment of the present invention, details of the operation after the power supply of the image input apparatus (scanner apparatus) is turned on and the application program is activated (step S611 in FIG. 6) will be explained.

The operation of the image input apparatus (scanner apparatus) according to the second embodiment of the present invention constructed as above will be described in detail below with reference to FIG. 7.

FIG. 7 is a flow chart showing the operation of the application program of an external apparatus 115 constructing an image input system according to the second embodiment of the present invention. First, when the application program is activated and enabled, this application program transmits to the image input apparatus an inquiry command for confirming the image input apparatus (step S701). When receiving this inquiry command, the image input apparatus turns on all lamps as explained in step S602 of FIG. 6, and adjusts the light amounts of all the lamps as explained in step S603 of FIG. 6.

After step S701 described above, the application program checks whether the light amounts of the lamps of the image input apparatus are stable (step S702). This is done by the application program by periodically transmitting an inquiry command to the image input apparatus and checking the response.

After that, if it is confirmed that the light amounts of the lamps of the image input apparatus are stable, the application program presents the user with an operation window (FIG. 5) required for image reading (step S703). On this operation window, the user can set parameters such as image type, resolution, and image size, and can issue a scan instruction such as preview. While no stabilization of the light amounts of the lamps of the image input apparatus is confirmed, the application program displays "Adjusting Light Amounts" on the monitor (not shown) of the external apparatus 115 (step S704).

As described above, while the lamp light amounts of the image input apparatus are unstable, no operation window is presented to the user to thereby prevent the user from causing operation errors. In addition, "Adjusting Light Amounts" is displayed to clearly show that this is not a trouble of the application program. Consequently, an image reading system very convenient for users can be provided.

When the user inputs the above-mentioned parameters after step S703 and issues a scan instruction, the application program detects this scan instruction (step S705), and transmits scan designation to the image input apparatus. Upon receiving this scan instruction, the image input apparatus detects the scan designation as explained in step S604 of FIG. 6, and performs the subsequent operation. As described above, the operation window (FIG. 5) is not presented to the user while the lamp light amounts of the image input apparatus are unstable, so operation errors by the user can be avoided. Also, since "Adjusting Light Amounts" is displayed while the light amounts are unstable, the user does not misunderstand the situation.

In the second embodiment of the present invention as described above, the image input apparatus comprises the internal light source 111 and the external light source 110 for irradiating an original, the internal light source light amount controller 109 for turning on/off the internal light source 111, the external light source light amount controller 112 for turning on/off the external light source 110, the CCD 103 for reading an original irradiated by the light source, the RAM 113 for temporarily storing the read data, the interface circuit 106 for transferring the data stored in the RAM 113 to the external apparatus 115, and the CPU 108 which turns on the light source when an application program is enabled by the OS on the external apparatus 115. Until the application program of the external apparatus 115 detects the stability of the light amounts of the light sources of the image input apparatus and the light amounts stabilize, the input window of the image read application program of the external apparatus 115 is not presented to the operator. Accordingly, this image input apparatus achieves the following functions and effects.

The stability of the light amounts of the lamps of the image input apparatus is detected during the light amount adjustment. While the light amounts are unstable, no input window of the image reading application program is presented. This can effectively prevent operation errors and misunderstanding by an operator.

[Other Embodiment]

In the first and second embodiments of the present invention described above, the arrangement shown in FIG. 1 is taken as an example of an image input system. However, the present invention is not limited to this arrangement shown in FIG. 1. For example, a desired number of image input apparatuses can be connected to a desired number of external apparatuses. Also, the present invention can be applied to an image reading/image forming system in which an image forming apparatus (printer) and the like are connected via a network, in addition to an image input apparatus and external apparatus.

In the above first and second embodiments of the present invention, a scanner apparatus is taken as an example of an image input apparatus. However, the present invention is not restricted to a scanner apparatus and is also applicable to a copying machine.

The present invention can be applied to a system constituted by a plurality of devices or to an apparatus comprising a single device. The objects of the present invention can also be achieved by supplying a storage medium storing program codes of software for implementing the functions of the above embodiments to a system or an apparatus, and reading out and executing the program codes stored in the storage medium by a computer (or a CPU or MPU) of the system or apparatus.

In this case, the program codes read out from the storage medium implement the functions of the present invention, and the storage medium storing these program codes constitutes the invention. As this storage medium for supplying the program codes, it is possible to use, e.g., a floppy disk, hard disk, optical disk, magnetooptical disk, CD-ROM, CD-R, magnetic tape, nonvolatile memory card, and ROM, and download is also usable.

Furthermore, besides the functions of the above embodiments are implemented by executing the readout program codes by the computer, the present invention includes a case where an OS or the like running on the computer performs a part or the whole of actual processing in accordance with designations by the program codes and thereby implements the functions of the above embodiments.

Furthermore, the present invention also includes a case where, after the program codes read out from the storage medium are written in a memory of a function extension board inserted into the computer or of a function extension unit connected to the computer, a CPU or the like of the function extension board or function extension unit performs a part or the whole of actual processing in accordance with designations by the program codes and thereby implements the functions of the above embodiments.

In the embodiments of the present invention as described above, the light sources of the image input apparatus are turned on when the operating means on the external apparatus, which is used to operate the image input apparatus, starts up. This can greatly reduce the time before actual reading is started, compared to the conventional method in which the adjustment of the light amounts of the light sources is started after the user instructs the image input apparatus to start reading. Also, when this method is used, it is possible to provide on the market an image input apparatus which can be easily used in a way based upon the energy saving standard such as ENERGY STAR.

Furthermore, the stability of the light amounts of the lamps of the image input apparatus is detected during the light amount adjustment. While the light amounts are unstable, the input means included in the operating means of the external apparatus is not provided. This can effectively prevent operation errors and misunderstanding by an operator.

The present invention is not limited to the above embodiments and various changes and modifications can be made within the spirit and scope of the present invention. Therefore, to apprise the public of the scope of the present invention the following claims are made.

What is claimed is:

1. An image input apparatus controllable from an external apparatus which runs an application program for the image input apparatus via an interface circuit comprising:
   a light source for irradiating an original;
   a reader for reading the original irradiated by said light source; and
   a controller for turning on said light source when the application program of said external apparatus is enabled thereby reducing the waiting time for stabilizing the light source when a reading command is initiated by the application program.

2. The apparatus according to claim 1, wherein said external apparatus comprises a switch for enabling or disabling said application program, and said controller is configured to turn on said light source when said application program is enabled by said switch.

3. The apparatus according to claim 1, wherein said controller is configured to hold providing input display while the light amount of said light source is unstable after said light source is turned on, the input display being a display for a user to perform operation settings.

4. The apparatus according to claim 2, wherein said switch is an operating system installed in said external apparatus.

5. The apparatus according to claim 2, wherein said light source comprises a plurality of light sources, and said controller turns on said plurality of light sources when said application program is enabled by said switch.

6. The apparatus according to claim 5, wherein said controller is configured to selectively turn on said plurality of light sources in accordance with the type of the original when instructed to perform image reading by said application program.

7. An image input system comprising an image input apparatus, and an external apparatus which runs image input apparatus operating program, wherein said image input apparatus comprises:
   a light source for irradiating an original;
   a reader for reading the original irradiated by said light source; and
   a controller for turning on said light source when image input apparatus operating program of said external apparatus is enabled thereby reducing the waiting time for stabilizing the light source when a reading command is initiated by the operating program.

8. The system according to claim 7, wherein said external apparatus further comprises switch for enabling or disabling said operating program, and said controller is configured to turn on said light source when said operating program is enabled by said switch.

9. The system according to claim 7, wherein said operation program is configured to hold providing an operating setting input means to an operator while the light amount of said light source is unstable after said light source is turned on.

10. The system according to claim 8, wherein said switch is an operating system installed in said external apparatus.

11. The system according to claim 8, wherein said light source comprises a plurality of light sources, and said controller is configured to turn on said plurality of light sources when said operating program is enabled by said switch.

12. The system according to claim 11, wherein said controller is configured to selectively turn on said plurality of light sources in accordance with the type of the original when instructed to perform image reading by said operating program.

13. A control method of an image input apparatus which includes a light source for irradiating an original, the method comprising the step of turning on the light source before a reading command for reading the original by the image input apparatus, wherein the image input apparatus is controlled by an external apparatus which runs an application program for the image input apparatus.

14. A light source control method applied to an image input system comprising an image input apparatus which comprises a plurality of light sources for irradiating an original, and reading means for reading the original irradiated by said light sources, and an external apparatus which comprises image input apparatus operating means, and light source selecting means included in said operating means to select a light source to be used in reading from said plurality of light sources, comprising the steps of:

turning on all said light sources when said operating means is enabled; turning off a light source except for a light source selected by said light source selecting means when said operating means of said external apparatus generates read designation while said light sources are ON; and turning on a light source selected by said light source selecting means when said operating means of said external apparatus generates read designation while said light sources are OFF.

15. A computer-readable storage medium storing a program for executing a control method of an image input apparatus which includes a light source for irradiating an original and reading means for reading the original, the method comprising the step of turning on the light source before a reading command for reading the original by the image input apparatus, wherein the image input apparatus is controlled by an external apparatus which runs an application program for the image input apparatus.

16. A computer-readable storage medium storing a program for executing a light source control method of an image input apparatus which includes a plurality of light sources for irradiating an original, reading means for reading the original irradiated by said light sources, and an external apparatus which includes operating means that runs selecting means for selecting a light source to be used from said plurality of light sources, wherein said light source control method comprising:

turning on all said plurality of light sources when said operating means is enabled;

turning off a predetermined number of light source except for the light source selected by said light source selecting means when said operating means of said external apparatus generates read designation while all said plurality of light sources are ON; and turning on a predetermined number of light source selected by said light source selecting means when said operating means of said external apparatus generates read designation while all said plurality of light sources are OFF.

* * * * *